United States Patent [19]

Ueda et al.

[11] Patent Number: 4,711,798
[45] Date of Patent: Dec. 8, 1987

[54] OPTICAL INFORMATION RECORDING MEDIUM

[75] Inventors: Yutaka Ueda, Yokohama; Tetsu Yamamuro, Tokyo, both of Japan

[73] Assignee: Ricoh Company, Ltd., Tokyo, Japan

[21] Appl. No.: 942,380

[22] Filed: Dec. 16, 1986

[30] Foreign Application Priority Data

Dec. 16, 1985 [JP] Japan ................... 60-281172

[51] Int. Cl.$^4$ .............................................. B32B 7/12
[52] U.S. Cl. .................................... 428/65; 430/945; 346/135.1; 346/137; 369/284; 369/288
[58] Field of Search ............... 428/64, 65; 430/945; 346/137, 135.1; 369/280, 284, 288, 287

[56] References Cited

U.S. PATENT DOCUMENTS 4,616,238 10/1986 Tani et al. ................. 369/284 X

Primary Examiner—Alexander S. Thomas
Attorney, Agent, or Firm—Oblon, Fisher, Spivak, McClelland, & Maier

[57] ABSTRACT

An optical information recording medium comprising a pair of substrates, with a recording layer comprising an organic dye being formed on one side of at least one substrate, fixed to each other through or without through a spacer and by an adhesive agent, in such a manner that the recording layer comes between the substrates, the adhesive agent comprising a compound of formula (I),

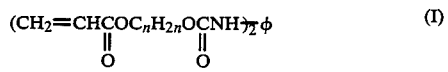
(I)

wherein $\phi$ represents

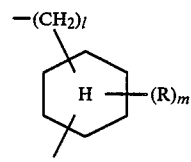

($l=0$ or 1) or

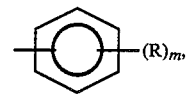

in which R represents a methyl group or an ethyl group, m is an integer of 1 to 4, and n is an integer of 2 to 4; and a compound of formula (II),

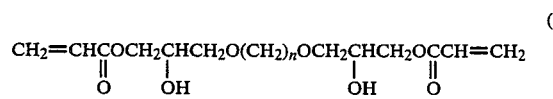
(II)

wherein n is an integer of 4 to 8, to which a compound of formula (III) may be added,

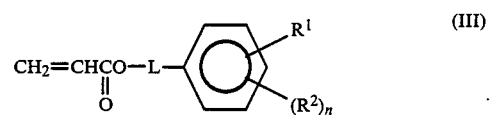
(III)

wherein L represents $-(CH_2CH_2O)_m-$ (m=1 to 4) or $-CH_2C(OH)HCH_2O-$, $R^1$ represents $-C_nH_{2n+1}$ (n=4 to 12), $R^2$ represents Cl or Br (n=0, 1 or 2).

6 Claims, 1 Drawing Figure

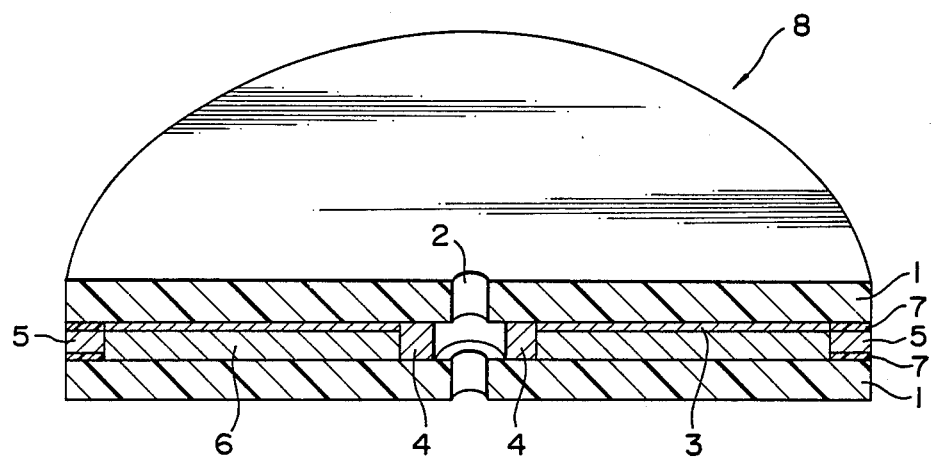

OPTICAL INFORMATION RECORDING MEDIUM

BACKGROUND OF THE INVENTION

The present invention relates to a sealed-type optical information recording medium.

It is required that an adhesive agent for sealing a disk-type information recording medium have no adverse effects on the recording materials for the medium to be sealed, for instance, by a by-product formed during the hardening of the adhesive agent, and the adhesive agent not contain a solvent. For such a purpose, an epoxy adhesive agent is usually employed. However, an epoxy adhesive agent has the shortcomings that when a plastic substrate is employed, the adhesive agent deforms the substrate upon heat application for the hardening of the adhesive agent, and a long time is required for the hardening. Recently, a room-temperature-hardening type epoxy adhesive agent is proposed, which becomes hard at room temperature. However, it also has the shortcoming that a long time is required for the hardening.

Under such circumstances, an ultra-violet-ray hardening type adhesive agent attracts attention. This adhesive agent appears promising because it neither produces any adverse by-products during the hardening nor contains any solvent therein. In the case of this adhesive agent, the hardening is carried out by a radical polymerization reaction and the radicals present in the adhesive agent are consumed by oxgen contained in the air, so that it has the shortcoming that a long time is required for the hardening of the surface when applied. In particular, when this adhesive agent is used in an air-sandwich-type sealed disk, the surface of the applied adhesive agent in the sealed inner portion does not become hard enough so that unreacted monomer components evaporate form the sealed inner portion, by which the recording layer is adversely affected. As a countermeasure for this problem, it is proposed to eliminate oxygen from the atmosphere for the hardening process. Specifically, a method of hardening the adhesive agent in an atmosphere of nitrogen is proposed. However, this method is not necessarily suitable for mass production, because a large-scale facility is required.

In a sealed type information recording medium including a recording layer at an adhesion portion, it is known that the adhesion strength between the recording material and the substrate is not so strong that there is the risk that the recording layer eventually peels off the substrate surface.

Further, a variety of organic dyes have been developed as the recording material. Some of them allow easy formation of a recording layer, for example, by coating the dye dissolved in a solvent. This is one of the advantages of the organic dyes over other materials. When an organic dye is dissolved in a solvent and is coated on a substrate, spin coating is most suitable for accurate film formation coating. The spin coating, however, has the shortcoming that the masking for not forming a recording layer in the adhesion portion is extremely difficult. Therefore, if a recording layer in the adhesion portion is removed prior to the coating of an adhesive agent, it is possible to secure sufficient adhesion strength between the recording layer and the substrate. In this case, dust is formed in the course of the removing of the recording layer, by which defective recording mediums are apt to be produced.

SUMMARY OF THE INVENTION

It is therefore an object of the present invention to provide a sealed-type optical information recording medium with its sealing reliability improved.

The above object of the present invention is attained by use of an adhesive agent comprising a compound having formula (I) and a compound having formula (II), by which the surface hardening of the adhesive agent is improved, and the deterioration of the recoridng material is minimized, respectively. In order to improve the adhesive strength, a compound having formula (III) can also be added to the adhesive agent.

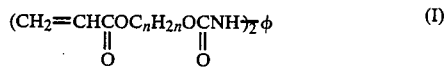

wherein φ represents

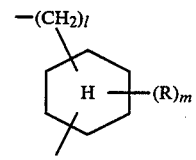

(l=0 or 1) or

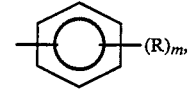

in which R represents a methyl group or an ethyl group, m is an integer of 1 to 4, and n is an integer of 2 to 4.

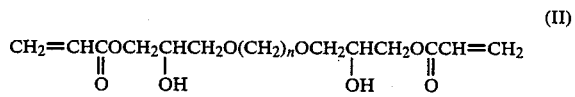

wherein n is an integer of 4 to 8.

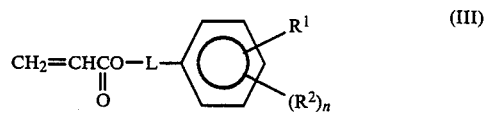

wherein L represents $-(CH_2CH_2O)_m-$ (m=1 to 4) or $-CH_2C(OH)HCH_2O-$, $R^1$ represents $-C_nH_{2n+1}$ (n=4 to 12), $R^2$ reprsents Cl or Br (n=0, 1 or 2)

In an embodiment of an optical information recording medium according to the present invention, a pair of disk-shaped substrates, with a recording layer comprising an organic dye being formed on one side of at least one substrate, are fixed to each other in a concentric configuration, through or without through a spacer such as an inner circumferential spacer and an outer circumferential spacer, in such a manner that the above-mentioned recording layer comes between the substrates, and the above-mentioned adhesive agent is used for the sealing thereof.

BRIEF DESCRIPTION OF THE DRAWING

The single FIGURE is a schematic sectional view of an optical recording medium according to the present invention.

DETAILED DESCRIPTION OF THE PREFERRED EMBODIMENTS

It is preferable that the adhesive agent for use in the present invention comprises the compound of formula (I) in an amount ranging from 40 wt.% to 70 wt.%, and the compound of formula (II) in an amount ranging from 10 wt% to 30 wt.%. When the compound of formula (III) is also employed, it is preferable that the amount be in the range of 10 wt.% to 30 wt.% in the adhesive agent.

With reference to the accompanying drawing, a sealed-type optical information recording medium according to the present invention will now be explained.

Each of a pair of disk-shaped substrates 1,1 is made of, for example, a transparent plastic plate. In each substrate 1, a fitting hole 2 is formed at the center thereof. One of the substrates 1,1 includes a recording layer 3 comprising an organic dye at one surface thereof. The substrates 1,1 are disposed in a concentric configuration, with an inner circumferential spacer 4 and an outer circumferential spacer 5 interposed therebetween, in such a fashion that the recording layer 3 comes inside so that a space 6 is formed between the recording layer 3 and the substrate 1 as shown in the FIGURE. The adhesive agent for use in the present invention is applied at a portion 7 for fixing the pair of the substrates 1,1.

The present invention is not necessarily restricted to the configuration shown in the FIGURE. For instance, the recording layer can be formed on both substrates 1,1 at one side of each thereof.

The materials and the layers of which the optical information recording medium according to the present invention is composed will now be specifically explained. In addition to the recording layer, an undercoat layer can be interposed between the substrate and the recording layer.

(1) Substrate

When recording and reproduction of information are performed on the substrate side, it is necessary that the substrate be transparent to the laser beams employed.

As the material for the substrate, plastics such as polyester, acrylic resin, polycarbonate, polyamide, polyolefine resin, phenolic resin, epoxy resin and polyimide, glass, ceramics and metals can be employed. On the surface of the substrate, preformats for address signal, and pregrooves as guide grooves can be formed. The substrate can be molded either by the photopolymer method or by the injection molding method.

(2) Recording Layer

The recording layer can record information by some optical changes in the layer, which may be caused by the recording layer being exposed to laser beams. The recording layer comprises as the main components an organic dye, for example, a polymethine dye, which will be described in detail later. Representative examples of the polymethine dye are a cyanine dye, a merocyanine dye, a croconium dye and a pyrylium dye.

In order to improve the recording characteristics and stability of the recording layer, two or more dyes can be employed in combination. Furthermore, in addition to the above dyestuffs, the following dyes can be employed: Phthalocyanine dyes, tetrahydrocholine dyes, dioxazine dyes, triphenothiazine dyes, triphenothiazine dyes, phenanthrene dyes, anthraquinone (Indanthrene) dyes, xanthene dyes, triphenylmethane dyes, and azulene dyes.

Metals such as In, Sn, Te, Bi, Al, Se, Ag and Cu, and metal compounds such as $TeO_2$ and SnO can be dispersed in the recording layer or made into a layer to form on the recording layer. Further, other polymeric materials, stabilizers for preservation (for example, metal complexes, and phenolic compounds), dispersing agent, agent for making incombustible, unguent, charging prevention agent, and plasticizer can be added to the recording layer.

The recording layer can be formed on the substrate by any of the conventional methods such as vacuum evaporation, sputtering, CVD (chemical vapor deposition) or solution coating. Of these methods, the solution coating method is most preferable for forming the recording layer.

When the solution coating method is performed, a polymethine dye and other components are dissolved in an organic solvent such as alcohol, ketone, amide, ether, sulfoxide, ester, halogenated aliphatic hydrocarbon, and aromatic hydrocarbon to prepare a solution. This solution is coated on a substrate by a conventional coating method, such as spray coating, spin coating, dip coating, blade coating and roller coating.

It is preferable that the thickness of the recording layer be in the range of 100 Å to 10 μm, more preferably in the range of 200 Å to 2 μm.

(3) Polymethine Dye

The following are representative polymethine dyes for use in the present invention:

(a) Cyanine Dye

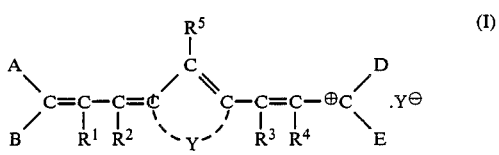

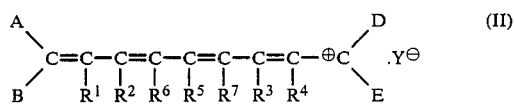

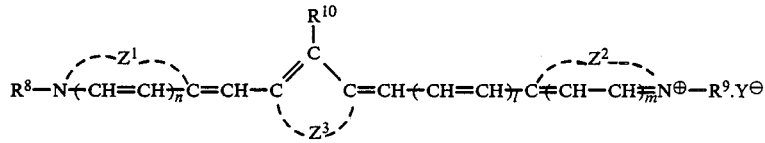

(III)

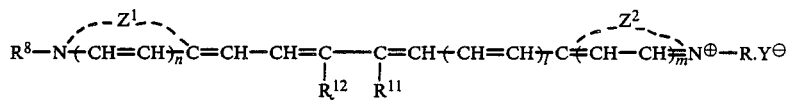

(IV)

In the above formulas (I)–(IV), A, B, D and E each represent a substituted or unsubstituted aryl group; $R^1$, $R^2$, $R^3$, $R^4$, $R^5$, $R^6$ and $R^7$ may be same or different, and each represents a hydrogen atom, a halogen atom or an alkyl group; Y represents a dihydric residue having an atomic group required for completing a pentacyclic ring or a hexacyclic ring; $R^8$ and $R^9$ may be same or different, and each represents a substituted or unsubstituted alkyl group or a substituted or unsubstituted aralkyl group or alkenyl group; $Z^1$ and $Z^2$ each represent an atomic group required for completing a substituted or unsubstituted heterocyclic ring; $Z^3$ represents an atomic group required for completing a substituted or unsubstituted pentacyclic ring or hexacyclic ring, and said pentacyclic ring or hexacyclic ring may be condensed with an aromatic ring; $R^{10}$ represents a hydrogen atom or a halogen atom; $R^{11}$ and $R^{12}$ each represent a hydrogen atom, a halogen atom, a hydroxyl group, a carboxyl group, an alkyl group, or a substituted or unsubstituted aryl group or acryloxy; and l, m and n each represent 0 or 1. Y represents an acid anion.

| Compound No. | A | B | D | E |
|---|---|---|---|---|
| Formula (I)-1 |  |  |  |  |
| Formula (I)-2 | " | " | " | " |
| Formula (I)-3 | 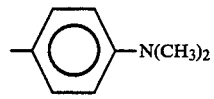 | 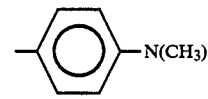 | 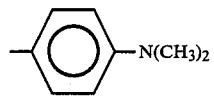 | 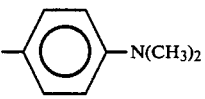 |
| Formula (I)-4 | " | 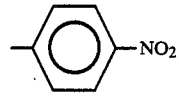 | " | 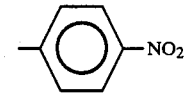 |
| Formula (I)-5 | 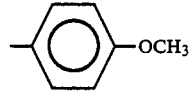 |  | 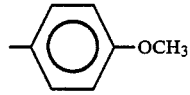 |  |
| Formula (I)-6 |  | 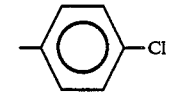 |  |  |
| Formula (I)-7 | 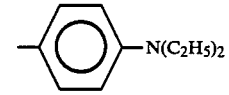 | 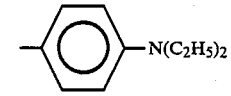 | " | " |
| Formula (II)-1 | " | " | " | " |
| Formula (II)-2 | " |  | " |  |

| Compound No. | $R^1$ | $R^2$ | $R^3$ | $R^4$ | $R^5$ | Y | $X^\ominus$ |
|---|---|---|---|---|---|---|---|
| Formula (I)-1 | H | H | H | H | H | ⏜⏝ | $ClO_4$ |

-continued

| | | | | | | | | |
|---|---|---|---|---|---|---|---|---|
| Formula (I)-2 | H | H | H | H | Cl | " | | ClO4 |
| Formula (I)-3 | H | H | H | H | H |  | | ClO4 |
| Formula (I)-4 | H | H | H | H | H |  | | ClO4 |
| Formula (I)-5 | H | H | H | H | Br |  | | ClO4 |
| Formula (I)-6 | H | H | H | H | H |  | |  |
| Formula (I)-7 | H | H | H | H | Cl | " | | " |
| | | | | | | $R^6$ | $R^7$ | |
| Formula (II)-1 | H | H | H | H | Cl | H | H | " |
| Formula (II)-2 | H | H | H | H | Cl |  | H | ClO4 |

| Compound No. Formula (III) | $-\overset{\frown Z^2\frown}{C=CH-CH\frac{}{m}N^\oplus}$ | $-\overset{\frown Z^1\frown}{N(CH=CH)\frac{}{n}C}$ | $Z^3$ | $R^8$ | $R^9$ | $R^{10}$ | l | $X^\ominus$ |
|---|---|---|---|---|---|---|---|---|
| 1 |  | 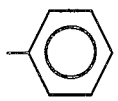 | 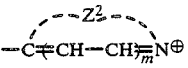 | CH3 | CH3 | H | 0 | I |
| 2 | 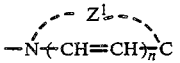 | 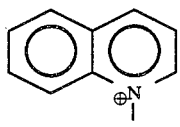 | 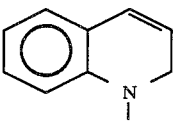 | C4H9 | C4H9 | Cl | 0 | Cl |
| 3 | 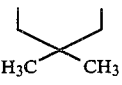 | 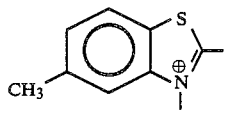 | 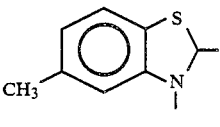 | C2H5 | C2H5 | H | 1 | I |
| 4 |  | 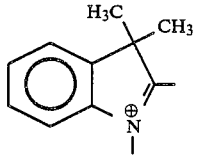 | 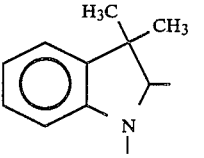 | C2H5 | C2H5 | H | 1 | I |
| 5 | 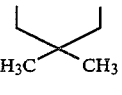 | 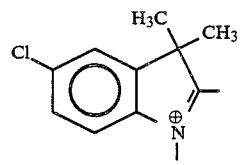 | 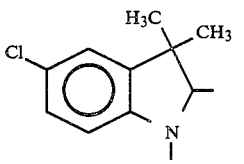 | C2H5 | C2H5 | H | 1 | I |

| Compound No. Formula (III) | $-C=CH-CH{=}_{\overline{m}}N^{\oplus}$ (with Z²) | $-N{\leftarrow}CH=CH{\rightarrow}_{\overline{n}}C$ (with Z¹) | Z³ | R⁸ | R⁹ | R¹⁰ | l | X⁻ |
|---|---|---|---|---|---|---|---|---|
| 6 | naphtho-indolenium (gem-diMe, N-Me) | naphtho-indoline (gem-diMe, N-Me) | ⌣ (propylene) | C₂H₅ | C₂H₅ | H | 1 | I |
| 7 | indolenium (gem-diMe, N-Me) | indoline (gem-diMe, N-Me) | ⌣ (propylene) | C₂H₅ | C₂H₅ | Cl | 1 | I |
| 8 | indolenium (gem-diMe, N-Me) | indoline (gem-diMe, N-Me) | C(CH₃)₂C(CH₃)₂ | C₂H₅ | C₂H₅ | H | 1 | SO₃—C₆H₄—CH₃ |
| 9 | indolenium (gem-diMe, N-Me) | indoline (gem-diMe, N-Me) | ⌣ (ethylene) | CH₃ | CH₃ | Br | 1 | SO₄—CH₃ |
| 10 | indolenium (gem-diMe, N-Me) | indoline (gem-diMe, N-Me) | ⌣ (ethylene) | C₄H₉ | C₄H₉ | H | 1 | SO₄—C₂H₅ |

| Compound No. Formula (IV) | $-C=CH-CH{=}_{\overline{m}}N^{\oplus}$ (with Z²) | $-N{\leftarrow}CH=CH{\rightarrow}_{\overline{n}}C$ (with Z¹) | R⁸ | R⁹ | R¹² | R¹¹ | l | X⁻ |
|---|---|---|---|---|---|---|---|---|
| 1 | benzoxazolium | benzoxazoline | C₂H₅ | C₂H₅ | H | H | 1 | Cl |
| 2 | indolenium (gem-diMe, N-Me) | indoline (gem-diMe, N-Me) | CH₃ | CH₃ | H | H | 1 | Cl |

-continued

| Compound No. | -C=CH-CH$_m$=N$^\oplus$ (Z$^2$) | -N-(CH=CH)$_n$-C (Z$^1$) | R$^8$ | R$^9$ | R$^{12}$ | R$^{11}$ | l | X$^\ominus$ |
|---|---|---|---|---|---|---|---|---|
| 3 | quinolinium | dihydroquinoline | C$_5$H$_7$ | C$_5$H$_7$ | H | H | 1 | Cl |
| 4 | 5-methoxybenzothiazolium | 5-methoxybenzothiazoline | C$_4$H$_9$ | C$_4$H$_9$ | H | H | 1 | Cl |
| 5 | 5-bromobenzoxazolium | 5-bromobenzoxazoline | CH$_3$ | CH$_3$ | H | H | 1 | I |
| 6 | 5-chloro-3,3-dimethylindolenium | 5-chloro-3,3-dimethylindoline | CH$_3$ | CH$_3$ | H | H | 1 | I |
| 7 | 3,3-dimethylbenzindolenium | 3,3-dimethylbenzindoline | CH$_3$ | CH$_3$ | H | H | 1 | I |
| 8 | naphthothiazolium | naphthothiazoline | C$_2$H$_5$ | C$_2$H$_5$ | H | H | 1 | SO$_3$—C$_6$H$_4$—CH$_3$ |
| 9 | phenanthroxazolium | phenanthroxazoline | C$_3$H$_7$ | C$_3$H$_7$ | H | H | 1 | C$_2$H$_5$—SO$_4$ |
| 10 | 5,7-dichloro-3,3-dimethylindolenium | 5,7-dichloro-3,3-dimethylindoline | CH$_3$ | CH$_3$ | H | Cl | 1 | CH$_3$SO$_4$ |

| Compound No. | $-\overset{Z^2}{\overset{|}{C}}=CH-CH)_{\overline{m}}N^\oplus$ | $-N(CH=CH)_{\overline{n}}^{Z^1}C-$ | $R^8$ | $R^9$ | $R^{12}$ | $R^{11}$ | l | $X^\ominus$ |
|---|---|---|---|---|---|---|---|---|
| 11 | 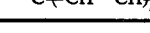 | 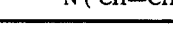 | CH$_3$ | CH$_3$ | H | Cl | 0 | ClO$_4$ |

(b) Merocyanine Dye $$\underset{A}{\left(\; A\; \right)}=CH-CH)_{\overline{n}}C\underset{\underset{O}{\parallel}}{\overset{B}{\left(\;\;\;\;\;\right)}} \quad (V)$$

wherein (A) represents the following rings, the benzene ring and naphthyl ring of which may have a substituent:

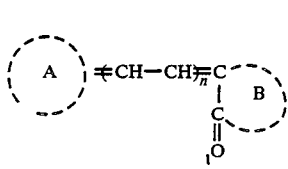

and the like;

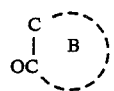

represents the following rings;

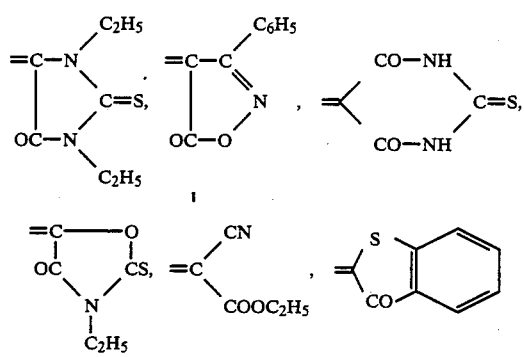

and n represents 1 or 2.

(c) Pyrylium Dye

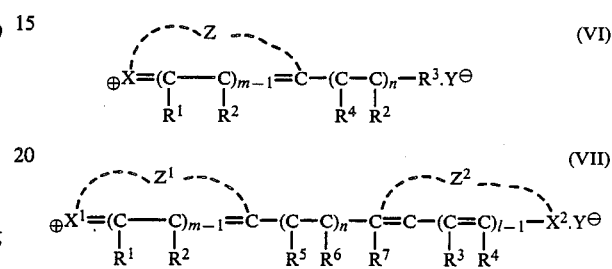

In the above formulas (VI) and (VII), X, $X^1$ and $X^2$ each represent a sulfur atom, an oxygen atom or a selenium atom; Z and $Z^1$ each represent a hydrocarbon group comprising an atomic group required for completing pyrylium, thiopyrylium, selenapyrylium, benzopyrylium, benzothiopyrylium, benzoselenapyrylium, naphthopyrylium, naphthothiopyrylium or naphthoselenapyrylium which may have been substituted; $Z^2$ represents a hydrocarbon group comprising an atomic group required for completing pyran, thiopyran, selenapyran, benzopyran, benzothiopyran, benzoselenapyran, naphthopyran, naphthothiopyran or naphthoselenapyran which may have been substituted; $R^1$, $R^2$, $R^3$ and $R^4$ each represent a hydrogen atom, a substituted or unsubstutued alkyl group or a substituted or unsubstituted aryl group; $R^5$, $R^6$ and $R^7$ each represent a hydrogen atom, a halogen atom, a substituted or unsubstituted alkyl group, a substituted or unsubstituted aryl group or a substituted or unsubstituted aralkyl group; m and l each represent 1 or 2; and n represents 0, 1 or 2. Y represents an acid anion.

(4) Undercoat Layer

An undercoat layer is employed for the following purposes: (a) improvement of the adhesiveness of the recording layer to the substrate, (b) protection of the recording layer from water and gases, (c) improvement of the preservability and stability of the recording layer, (d) improvement of the reflection ratio of the recording layer, (e) protection of the substrate from solvents, and (f) for formation of pregrooves in the recording layer.

For the purpose (a), a variety of polymeric materials such as ionomer resin, polyamide resin, vinyl resin, natural polymeric material, silicone and liquid rubber, and silane coupling agent can be employed.

For the purposes (b) and (c), in addition to the above polymeric materials in (a), inorganic compounds such as SiO$_2$, MgF$_2$, SiO, TiO$_2$, ZnO, TiN and SiN, and metals and metalloids such as Zn, Cu, S, Ni, Cr, Ge, Se, Au, Ag and Al can be employed.

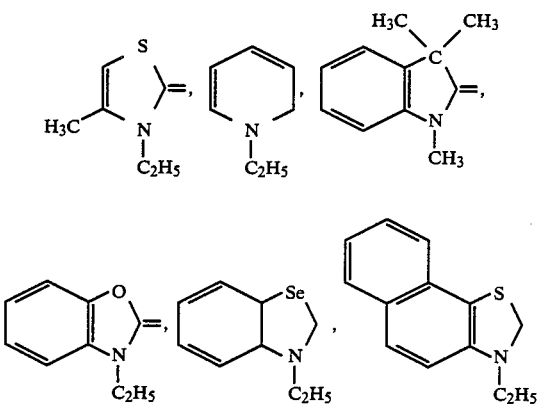

For the purpose (d), metals such as Ag and Al, and dyes having metallic luster such as methine dye and xanthene dye can be employed.

The present invention will now be explained in more detail with reference to the following examples. These examples are given for an illustrative purpose and therefore the present invention will not be restricted to these examples.

EXAMPLE 1

A pair of disk-shaped polymethyl methacrylate substrates having a diameter of 200 mm and a thickness of 1 mm were prepared. A pregroove was formed in one of the substrates by the conventional photopolymer method.

A 1,2-dichloroethane solution of the following dye with a concentration thereof being 0.7 wt.% was coated on the substrate by spin coating at 600 rpm, so that a recording layer was formed thereon.

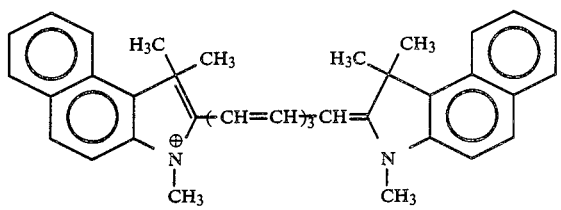

By use of an inner circumferential spacer and an outer circumferential spacer each having a thickness of 1 mm, and an adhesive agent prepared in the following formulation, an optical information recording medium No. 1 of a sealed disk-type according to the present invention was fabricated in the same configuration as shown in the FIGURE. In the formulation give below, A represents a moiety of $$CH_2=CHCO-$$
$$\underset{O}{\|}$$

|  | Parts by weight |
|---|---|
| A—CH$_2$CH$_2$OCNH<br>$\underset{O}{\|\|}$<br>CH$_3$—⟨⟩<br>A—CH$_2$CH$_2$OCNH<br>$\underset{O}{\|\|}$ | 60 |
| A—CH$_2$C(OH)HCH$_2$O$\overparen{(CH_2)_6}$OCH$_2$C(OH)HCH$_2$—A | 20 |
| A—CH$_2$C(OH)HCH$_2$O—⟨⟩ with Br, Br substituents 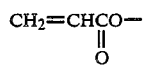 | 20 |
| 2,2-dimethoxy-2-phenylacetophenone | 2 |

|  | Parts by weight |
|---|---|
| (photopolymerization initiator) |  |

The thus fabricated optical information recording medium was allowed to stand at 60° C., 90% R.H. for 1,000 hours and the recording characteristics thereof were measured and compared with the initial values thereof. The results are shown in Table 1.

EXAMPLE 2

Example 1 was repeated except that the formulation of the adhesive agent employed in Example 1 was replaced by the following formulation, whereby an optical information recording medium No. 2 according to the present invention was fabricated.

|  | Parts by weight |
|---|---|
| A—CH$_2$CH$_2$OCNHCH$_2$ CH$_3$<br>$\underset{O}{\|\|}$ H CH$_3$<br>A—CH$_2$CH$_2$OCNH⟨⟩CH$_3$<br>$\underset{O}{\|\|}$ | 65 |
| A—CH$_2$C(OH)HCH$_2$O$\overparen{(CH_2)_6}$OCH$_2$C(OH)HCH$_2$—A | 20 |
| A—CH$_2$CH$_2$O—⟨⟩—C$_9$H$_{19}$ | 15 |
| 2,2-dimethoxy-2-phenylacetophenone (photopolymerization initiator) | 2 |

The recording characteristics of the above optical information recording medium were measured in the same manner as in Example 1. The result are shown in Table 1.

EXAMPLE 3

Example 1 was repeated except that the formulation of the adhesive agent employed in Example 1 was replaced by the following formulation, whereby an optical information recording medium No. 3 according to the present invention was fabricated.

|  | Parts by weight |
|---|---|
| A—C(CH$_3$)HCH$_2$OCNHCH$_2$ CH$_3$<br>$\underset{O}{\|\|}$ H CH$_3$<br>A—C(CH$_3$)HCH$_2$OCNH⟨⟩CH$_3$<br>$\underset{O}{\|\|}$ | 50 |
| A—CH$_2$C(OH)HCH$_2$O$\overparen{(CH_2)_4}$OCH$_2$C(OH)HCH$_2$—A | 25 |

|  | Parts by weight |
|---|---|
| A—(CH₂CH₂O)₁₂—C₆H₄—C₆H₁₃ | 25 |
| 2,2-dimethoxy-2-phenylacetophenone (photopolymerization initiator) | 2 |

The recording characteristics of the above optical information recording medium were measured in the same manner as in Example 1. The results are shown in Table 1.

EXAMPLE 4

Example 1 was repeated except that the formulation of the adhesive agent employed in Example 1 was replaced by the following formulation, whereby an optical information recording medium No. 4 according to the present invention was fabricated.

|  | Parts by weight |
|---|---|
| A—C(CH₃)HCH₂OC(O)NH—C₆H₃(CH₃)—NHC(O)OCH₂C(CH₃)H—A | 60 |
| A—CH₂C(OH)HCH₂O(CH₂)₇₆OCH₂C(OH)HCH₂—A | 30 |
| A—(CH₂CH₂O)₇₄—C₆H₃Cl₂ | 10 |
| 2,2-dimethoxy-2-phenylacetophenone (photopolymerization initiator) | 2 |

The recording characteristics of the above optical information recording medium were measured in the same manner as in Example 1. The results are shown in Table 1.

EXAMPLE 5

Example 1 was repeated except that the formulation of the adhesive agent employed in Example 1 was replaced by the following formulation, whereby an optical information recording medium No. 5 according to the present invention was fabricated.

|  | Parts by weight |
|---|---|
| A—CH₂CH₂OC(O)NHCH₂—C₆H₇(CH₃)₃(H) / A—CH₂CH₂OC(O)NH— | 70 |
| A—CH₂C(OH)HCH₂O(CH₂)₇₆OCH₂C(OH)HCH₂—A | 30 |
| 2,2-dimethoxy-2-phenylacetophenone (photopolymerization initiator) | 2 |

The recording characteristics of the above optical information recording medium wer measured in the same manner as in Example 1. The results are shown in Table 1.

EXAMPLE 6

Example 1 was repeated except that the formulation of the adhesive agent employed in Example 1 was replaced by the following formulation, whereby an optical information recording medium No. 6 according to the present invention was fabricated.

|  | Parts by weight |
|---|---|
| A—CH₂CH₂OC(O)NHCH₂—C₆H₇(CH₃)₃(H) / A—CH₂CH₂OC(O)NH— | 65 |
| A—CH₂C(OH)HCH₂O(CH₂)₇₆OCH₂C(OH)HCH₂—A | 20 |
| A—CH₂CH₂O—C₆H₂Cl₂—C₉H₁₉ | 15 |
| 2,2-dimethoxy-2-phenylacetophenone (photopolymerization initiator) | 2 |

The recording characteristics of the above optical information recording medium were measured in the same manner as in Example 1. The results are shown in Table 1.

EXAMPLE 7

Example 1 was repeated except that the formulation of the adhesive agent employed in Example 1 was replaced by the following formulation, whereby an optical information recording medium No. 7 according to the present invention was fabricated.

| | Parts by weight |
|---|---|
| A—CH₂CH₂OCNH— (attached to benzene ring with CH₃ substituent and second A—CH₂CH₂OCNH— group, C=O in urethane linkages) | 60 |
| A—CH₂C(OH)HCH₂O(—CH₂)₄OCH₂C(OH)HCH₂—A | 20 |
| A—CH₂C(OH)HCH₂O—(benzene ring with 2 Br and C₉H₁₉) | 20 |
| 2,2-dimethoxy-2-phenylacetophenone (photopolymerization initiator) | 2 |

The recording characteristics of the above optical information recording medium were measured in the same manner as in Example 1. The results are shown in Table 1.

EXAMPLE 8

Example 1 was repeated except that the formulation of the adhesive agent employed in Example 1 was replaced by the following formulation, whereby an optical information recording medium No. 8 according to the present invention was fabricated.

| | Parts by weight |
|---|---|
| A—CH₂CH₂OCNH— (benzene ring with C₂H₅ and second A—CH₂CH₂OCNH— group, C=O urethane) | 50 |
| A—CH₂C(OH)HCH₂O(—CH₂)₆OCH₂C(OH)HCH₂—A | 20 |
| A(—CH₂CH₂O)₃—(benzene ring)—C₉H₁₉ | 30 |
| 2,2-dimethoxy-2-phenylacetophenone (photopolymerization initiator) | 2 |

The recording characteristics of the above optical information recording medium were measured in the same manner as in Example 1. The results are shown in Table 1.

EXAMPLE 9

Example 1 was repeated except that the formulation of the adhesive agent employed in Example 1 was replaced by the following formulation, whereby an optical information recording medium No. 9 according to the present invention was fabricated.

| | Parts by weight |
|---|---|
| A—C(CH₃)HCH₂OCNHCH₂— (cyclohexane ring with H, and C₂H₅, C₂H₅, C₂H₅ substituents; with second A—C(CH₃)HCH₂OCNH— group, C=O urethane) | 60 |
| A—CH₂C(OH)HCH₂O(—CH₂)₅OCH₂C(OH)HCH₂—A | 20 |
| A—CH₂C(OH)HCH₂O—(benzene ring with C₄H₉ and Cl) | 20 |
| 2,2-dimethoxy-2-phenylacetophenone (photopolymerization initiator) | 2 |

The recording characteristics of the above optical information recording medium were measured in the same manner as in Example 1. The results are shown in Table 1.

EXAMPLE 10

Example 1 was repeated except that the formulation of the adhesive agent employed in Example 1 was replaced by the following formulation, whereby an optical information recording medium No. 10 according to the present invention was fabricated.

| | Parts by weight |
|---|---|
| A—C(CH₃)HCH₂OCNH— (benzene ring with CH₃ and second A—C(CH₃)HCH₂OCNH— group, C=O urethane) | 70 |
| A—CH₂C(OH)HCH₂O(—CH₂)₄OCH₂C(OH)HCH₂—A | 30 |
| 2,2-dimethoxy-2-phenylacetophenone (photopolymerization initiator) | 2 |

The recording characteristics of the above optical information recording medium were measured in the same manner as in Example 1. The results are shown in Table 1.

COMPARATIVE EXAMPLE 1

Example 1 was repeated except that the formulation of the adhesive agent employed in Example 1 was replaced by the following formulation, whereby a comparative optical information recording medium No. 1 was fabricated.

| | Parts by weight |
|---|---|
| 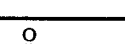 | 60 |
| A—CH₂C(OH)HCH₂O(CH₂)₄OCH₂C(OH)HCH₂—A | 20 |
| 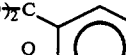 | 20 |
| 2,2-dimethoxy-2-phenylacetophenone | 2 |

-continued

| | Parts by weight |
|---|---|
| 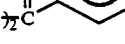 | 20 |
| 2,2-dimethoxy-2-phenylacetophenone (photopolmerization initiator) | 2 |

The recording characteristics of the above optical information recording medium were measured in the same manner as in Example 1. The results are shown in Table 1.

TABLE 1

| | Initial Values | | | After 1000 hrs at 60° C., 90% R.H. | | |
|---|---|---|---|---|---|---|
| | Reflection Ratio (%) | C/N (dB) | Repeated* Reproduction | Reflection Ratio (%) | C/N (dB) | Repeated* Reproduction |
| Example 1 | 26.0 | 53 | over 1 mil. | 24.2 | 51 | over 1 mil. |
| Example 2 | 26.0 | 53 | over 1 mil. | 24.5 | 51 | over 1 mil. |
| Example 3 | 26.0 | 53 | over 1 mil. | 23.8 | 50 | over 1 mil. |
| Example 4 | 26.0 | 53 | over 1 mil. | 24.0 | 51 | over 1 mil. |
| Example 5 | 26.0 | 53 | over 1 mil. | 24.5 | 51 | over 1 mil. |
| Example 6 | 26.0 | 53 | over 1 mil. | 24.5 | 52 | over 1 mil. |
| Example 7 | 26.0 | 53 | over 1 mil. | 24.0 | 51 | over 1 mil. |
| Example 8 | 26.0 | 53 | over 1 mil. | 24.2 | 51 | over 1 mil. |
| Example 9 | 26.0 | 53 | over 1 mil. | 23.5 | 50 | over 1 mil. |
| Example 10 | 26.0 | 53 | over 1 mil. | 24.0 | 51 | over 1 mil. |
| Comp. Example 1 | 26.0 | 53 | 450,000 | 19 | 47 | upto 10,000 |
| Comp. Example 2 | 26.0 | 53 | 450,000 | Peeled off during storage | | |

*In the above table, the repeated reproduction means the number of reproductions before the error ratio began to increase in the course of continuously repeated reproduction using the same track.

(photopolymerization initiator)

The recording characteristics of the above optical information recording medium were measured in the same manner as in Example 1. The results are shown in Table 1.

COMPARATIVE EXAMPLE 2

Example 1 was repeated except that the formulation of the adhesive agent employed in Example 1 was replaced by the following formulation, whereby a comparative optical information recording medium No. 2 was fabricated.

| | Parts by weight |
|---|---|
| 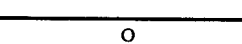 | 55 |
| A—(CH₂)₃CCH₂OH | 25 |

What is claimed is:

1. An optical information recording medium comprising a pair of substrates, with a recording layer comprising an organic dye being formed on one side of at least one substrate, fixed to each other through or without through a spacer and by an adhesive agent, in such a manner that said recording layer comes between said substrates, said adhesive agent comprising a compound of formula (I), $$(CH_2=CHCOC_nH_{2n}OCNH)_{\overline{2}}\phi \quad (I)$$
$$\phantom{xxxxx}\overset{\|}{O}\phantom{xxxx}\overset{\|}{O}$$

wherein φ represents

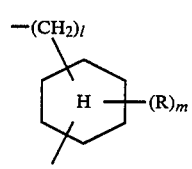

(l=0 or 1) or

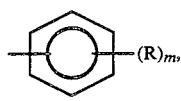

in which R represents a methyl group or an ethyl group, m is an integer of 1 to 4, and n is an integer of 2 to 4; and a compound of formula (II),

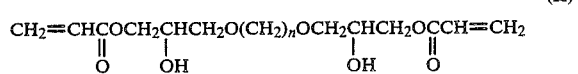

wherein n is an integer of 4 to 8.

2. The optical information recording medium as claimed in claim 1, wherein said adhesive agent further comprises a compound of formula (III),

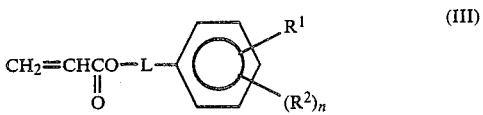

wherein L represents $-(CH_2CH_2O)_{\overline{m}}(m=1$ to 4) or $-CH_2C(OH)HCH_2O-$, $R^1$ represents $-C_nH_{2n+1}$ (n=4 to 12), $R^2$ represents Cl or Br (n=0, 1 or 2).

3. The optical information recording medium as claimed in claim 2, wherein said adhesive agent comprises said compound of formula (I) in an amount of 40 wt.% to 70 wt.%, said compound of formula (II) in an amount of 10 wt.% to 30 wt.%, and said compound of formula (III) in an amount of 10 wt.% to 30 wt.%.

4. The optical information recording medium as claimed in claim 1, wherein said adhesive agent comprises said compound of formula (I) in an amount of 40 wt.% to 70 wt.%, and said compound of formula (II) in an amount of 10 wt.% to 30 wt.%.

5. The optical information recording medium as claimed in claim 1, wherein said recording layer comprises as the main component a polymethine dye.

6. The optical information recording medium as claimed in claim 1, wherein said spacer comprises an inner circumferential spacer and an outer circumferential spacer.

* * * * *